(12) United States Patent
Sun et al.

(10) Patent No.: US 12,638,640 B2
(45) Date of Patent: May 26, 2026

(54) FERRULE ASSEMBLY AND FIBER OPTIC FAST CONNECTOR COMPRISING THE SAME

(71) Applicants: CHAOZHOU THREE-CIRCLE (GROUP) CO., LTD., Chaozhou (CN); NANCHONG THREE-CIRCLE ELECTRONICS CO., LTD., Nanchong (CN)

(72) Inventors: Jian Sun, Chaozhou (CN); Zhenhong Zheng, Chaozhou (CN); Shijun Chen, Chaozhou (CN); Xueyun Huang, Chaozhou (CN)

(73) Assignees: CHAOZHOU THREE-CIRCLE (GROUP) CO., LTD., Chaozhou (CN); NANCHONG THREE-CIRCLE ELECTRONICS CO., LTD., Nanchong (CN)

(*) Notice: Subject to any disclaimer, the term of this patent is extended or adjusted under 35 U.S.C. 154(b) by 290 days.

(21) Appl. No.: 18/566,662

(22) PCT Filed: May 24, 2022

(86) PCT No.: PCT/CN2022/094594
§ 371 (c)(1),
(2) Date: Dec. 3, 2023

(87) PCT Pub. No.: WO2022/253039
PCT Pub. Date: Dec. 8, 2022

(65) Prior Publication Data
US 2024/0272371 A1 Aug. 15, 2024

(30) Foreign Application Priority Data

Jun. 3, 2021 (CN) .......................... 202110623150.8
Jul. 27, 2021 (CN) .......................... 202121722270.5

(51) Int. Cl.
*G02B 6/38* (2006.01)

(52) U.S. Cl.
CPC .................................. *G02B 6/3801* (2013.01)

(58) Field of Classification Search
None
See application file for complete search history.

(56) References Cited

U.S. PATENT DOCUMENTS 9,423,586 B2 * 8/2016 Sun ...................... G02B 6/3846
2011/0044588 A1 * 2/2011 Larson ................. G02B 6/3888
385/81

(Continued)

FOREIGN PATENT DOCUMENTS

CN 202735541 U 2/2013
CN 111610601 A 9/2020

(Continued)

OTHER PUBLICATIONS

International Search Report of PCT Patent Application No. PCT/CN2022/094594 issued on Aug. 19, 2022.

*Primary Examiner* — Jerry Rahll

(57) ABSTRACT

A ferrule assembly and a fiber optic fast connector comprising the same are provided. The ferrule assembly comprises a tailstock provided with a window portion, in which a supporting platform is provided, and having an end provided with an opening. A ferrule is provided, with a receiving cavity for receiving an optical fiber. The ferrule has one end passing through the opening and then abutting against and connecting with the supporting platform to constitute a stepped portion and provided with a groove portion, and has another end located outside of the tailstock. A pressing block is provided, comprising abutting against and connecting with the groove portion, an end handle portion abutting against and connecting with the stepped portion, and a flexible portion connected with the pressing portion and the (Continued)

end handle portion, respectively. A lock catch slidably sleeved on the tailstock is provided.

10 Claims, 11 Drawing Sheets

(56)                     References Cited

U.S. PATENT DOCUMENTS

2013/0266269  A1*  10/2013  Li  ........................ G02B 6/3869
                                                  385/81
2020/0049897  A1*   2/2020  Li  ........................ G02B 6/3846

FOREIGN PATENT DOCUMENTS

CN          212647066  U      3/2021
CN          212723453  U      3/2021
CN          215813444  U      2/2022

* cited by examiner

FERRULE ASSEMBLY AND FIBER OPTIC FAST CONNECTOR COMPRISING THE SAME

TECHNICAL FIELD

The disclosure relates to the technical field of connectors, more particularly to a ferrule assembly and a fiber optic fast connector comprising the same.

BACKGROUND

Existing fiber optic connectors mainly include pass-through connectors and pre-embedded connectors. The pre-embedded connector usually is provided with one optical fiber predisposed in an inner bore of a ferrule body. The one optical fiber has one end passing through the ferrule body and being grinded and polished to form a tip for connection with another connector, and another end with a length being exposed for connection with a further optical fiber.

The pre-embedded connector usually comprises a ferrule assembly, a connector body, and other parts such as a front cover, a rear cover, and an optical cable holder. The core component of the pre-embedded connector is the ferrule assembly.

Usually, the ferrule assembly is mainly consisting of parts including a ferrule having an inner bore, a pressing block, a tailstock, a predisposed optical fiber, and a lock catch. The ferrule has one end serving as a plug end and the other end having a groove portion with the inner bore being exposed. The predisposed optical fiber is placed in the inner bore of the ferrule, with one end located at the plug end of the ferrule and the other end located at the groove portion of the ferrule. The tailstock is provided with a window portion, in which a stepped portion is provided. The ferrule is sleeved within the tailstock in such a manner that the plug end extends out of the opening in the front of the tailstock and the groove portion is exposed on the window portion. The pressing block comprises a pressing portion and an end handle portion, wherein the pressing block is disposed in the window portion in such a manner that the pressing portion matches with the groove portion and the end handle portion matches with the stepped portion. The lock catch is moveably sleeved outside the tailstock.

When the ferrule assembly is in the unlocking state, the lock catch is located at a position corresponding to the end handle portion, and there is spare space between the pressing portion and the bottom surface of the groove portion. In such a case, the further optical fiber can be inserted into the exposed inner bore of the groove portion and spliced with the predisposed optical fiber. Then, the lock catch can be moved to a position corresponding to the pressing portion, to allow the ferrule assembly to enter the locking state, in which the splice joint of optical fibers is tightened due to the pressing portion.

In practical operation, as the lock catch moves towards the locking direction, the end handle portion of the pressing block deforms to an extent, thereby achieving a close, tight fit between the pressing portion and the bottom surface of the groove portion. However, in order to move the lock catch towards the position corresponding to the pressing portion, a greater pushing force applied on the lock catch is required due to the relative high rigidity of the pressing block. Hence, it is inconvenient and has low assembly efficiency. Furthermore, in the locking state, relative high rigidity of the pressing block and great deformation restoring force of the pressing block may result in not tight fit between the pressing block and the bottom surface of the groove portion, and result in failures in tightening the splice joint of optical fibers. In addition, after repeated locking and unlocking operations, the pressing block may be deformed in a non-reversible manner, such that the stability of the optical fiber connector is decreased.

SUMMARY

An object of the disclosure is to provide a ferrule assembly and a fiber optic fast connector comprising the same, which has increased assembly efficiency, compact structure, and high stability.

In order to solve the above technical problems, the disclosure provides a ferrule assembly comprising a tailstock, a ferrule, a pressing block, and a lock catch. The tailstock is provided with a window portion, in which a supporting platform is provided, and the tailstock has one end provided with an opening. The ferrule is provided inside with a receiving cavity for receiving an optical fiber. The ferrule has one end passing through the opening, and in conjunction with the supporting platform, to constitute a stepped portion, and it is provided with a groove portion corresponding to the window portion. The receiving cavity is exposed on the groove portion. The ferrule has another end located outside of the tailstock. The pressing block comprises a pressing portion, a flexible portion, and an end handle portion, wherein the pressing portion abuts against and connects with the groove portion, the end handle portion abuts against and connects with the stepped portion, and the flexible portion connects with the pressing portion and the end handle portion, respectively. The lock catch is slidably sleeved on the tailstock.

Preferably, a bottom surface of the pressing portion may have a plane structure with a width less than a maximum width of the pressing portion.

Preferably, a ratio of a width $K_1$ of the bottom surface of the pressing portion to the maximum width $K_2$ of the pressing portion may be (0.1-0.5):1.

Preferably, a maximum thickness $H_3$ of the pressing portion may be greater than a thickness $H_1$ of the flexible portion and a thickness $H_2$ of the end handle portion, respectively, and the thickness $H_2$ of the end handle portion may be greater than the thickness $H_1$ of the flexible portion.

Preferably, a vertical distance $S_1$ from a bottom surface of the end handle portion to a bottom surface of the pressing portion may be less than a maximum vertical distance $S_2$ from a top surface of the stepped portion to a bottom surface of the groove portion.

Preferably, $S_1$ and $S_2$ may satisfy a condition of:

$$0.02 \text{ mm} \leqslant S_2 - S_1.$$

$H_1$ and $H_3$ may satisfy conditions of:

$$2.7 \leqslant \frac{H_3}{H_1} \leqslant 10; \text{ and}$$

$$0.2 \text{ mm} \leqslant H_1 \leqslant 0.7 \text{ mm}.$$

Preferably, the ferrule may comprise a first ferrule, a second ferrule, and a connecting component, wherein the first ferrule is provided with a jack, the groove portion is provided on the second ferrule, and the first ferrule and the second ferrule are connected through the connecting component.

Preferably, the tailstock may be provided, at one end distal to the opening, with a limiting hook and a slot, wherein the slot extends along a longitudinal direction of the tailstock.

Preferably, one end of the tailstock may be cylinder-shaped, and a ratio of a width of the slot to a diameter of the end of the tailstock may be less than 0.5:1.

Preferably, the receiving cavity may comprise a first cavity section provided inside the ferrule and a second cavity section exposed on the groove portion, and a ratio of a depth $d_1$ of the second cavity section to a diameter do of the first cavity section may be greater than 1:2.

Preferably, a ratio of the depth $d_1$ of the second cavity section to the diameter do of the first cavity section may be less than 0.992.

Preferably, the tailstock may have a sleeving portion, and the ferrule passes through the sleeving portion in such a manner that the groove portion is exposed on the window portion, an edge of the sleeving portion proximal to the window portion extends inward to form a snap protrusion, the ferrule is provided with an engaging platform, and the snap protrusion abuts against the engaging platform and limits rotation of the ferrule about an axial direction.

In order to solve the above technical problems, the disclosure further provides a fiber optic fast connector comprising a body and the ferrule assembly according to any one of those mentioned above, wherein the ferrule assembly is mounted inside the body.

The disclosure has advantages as follows.

Due to the design of matching structure including the pressing block, the groove portion, and the window portion of the tailstock, the present invention does not need too much force for moving the lock catch to the position corresponding to the pressing portion during the locking process. Thus, the assembly efficiency can be improved. In the locking state, as the portion of the pressing block which deforms is mainly the flexible portion which has well flexibility and small deformation restoring force, the acting force of the lock catch is sufficient to ensure the close, tight fit between the pressing portion of the pressing block and the bottom surface of the groove portion, and ensure tightened splice joint of optical fibers under the applied force. The flexible portion has well flexibility and thus has good anti-fatigue performance. The original performance of the pressing block can be maintained even after repeated locking and unlocking operations, thereby preventing a decrease in stability of the optical fiber connector. In addition, as the bottom surface of the pressing portion of the pressing block has a relative small width, it is ensured that a failure in tightening the splice joint of optical fibers caused when the platform is inclined can be effectively avoided, thereby assuring product yield and quality.

Figure 1:
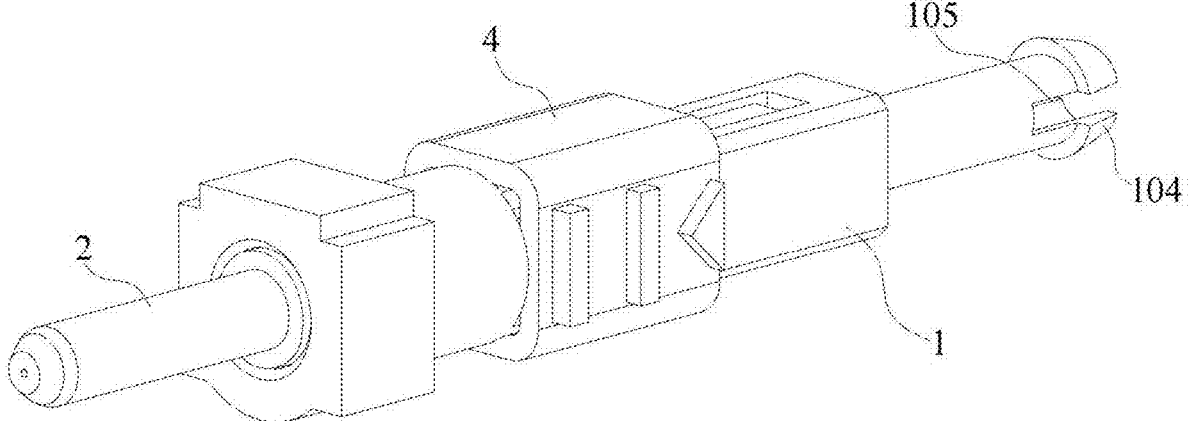
FIG. 1 is a schematic structural view of a ferrule assembly according to an embodiment of the disclosure.

The reference numerals are listed as follows.

1. tailstock; 101. window portion; 102. supporting platform; 103. opening; 104. limiting hook; 105. slot; 106. sleeving portion; 1061. snap protrusion;
2. ferrule; 201. receiving cavity; 2011. first cavity section; 2012. second cavity section; 202. groove portion; 203. first ferrule; 204. connecting component; 205. second ferrule; 206. engaging platform;
3. pressing block; 301. pressing portion; 302. flexible portion; 303. end handle portion; 304. inclined transition surface;
4. lock catch;
5. stepped portion;
6. body; 601. body window portion; 602. first abutment protrusion; 603. second abutment protrusion; 604. limit protrusion;
7. ferrule assembly; 8. rear cover; 9. optical cable holder; 10. front cover; 1001. abutment window; 1002. front abutment side; 1003. rear abutment side; 11. cover plate.

DETAILED DESCRIPTION OF ILLUSTRATED EMBODIMENTS

The technical solutions of the embodiments of the present disclosure are clearly and completely described below with reference to the accompanying drawings of the embodiments of the present disclosure. Apparently, the described embodiments are merely a part rather than all of the embodiments of the present disclosure. All other embodiments obtained by those of ordinary skill in the art based on the embodiments of the present disclosure without creative efforts shall fall within the scope of the present disclosure.

It should be noted that the terms, such as "center", "upper", "lower", "front", "rear", "left", "right", "vertical", "horizontal", "top", "bottom", "inner", and "outer" as used in the description, refer to position and orientation relationships as shown in the drawings for convenience of description and for the purpose of simplicity. They are not intended to indicate or hint a limitation in terms of specific orientation or configuration and operation with specific orientation to the described device or element, and should not be regarded as a limitation to the present disclosure.

It should be noted that, unless defined or specified otherwise, terms such as "mount", "connect" and "attach" used in the description are intended to have meanings commonly understood in a broad sense. For example, "connect" may refer to fixedly connect, or detachably connect, or integrally connect; or mechanically connect, or electrically connect; or directly connect, or indirectly connect via an intermediium, or internally communicate between two components. The meanings of the terms used herein may be understood by those skilled in the art in accordance with specific conditions.

Figure 2:
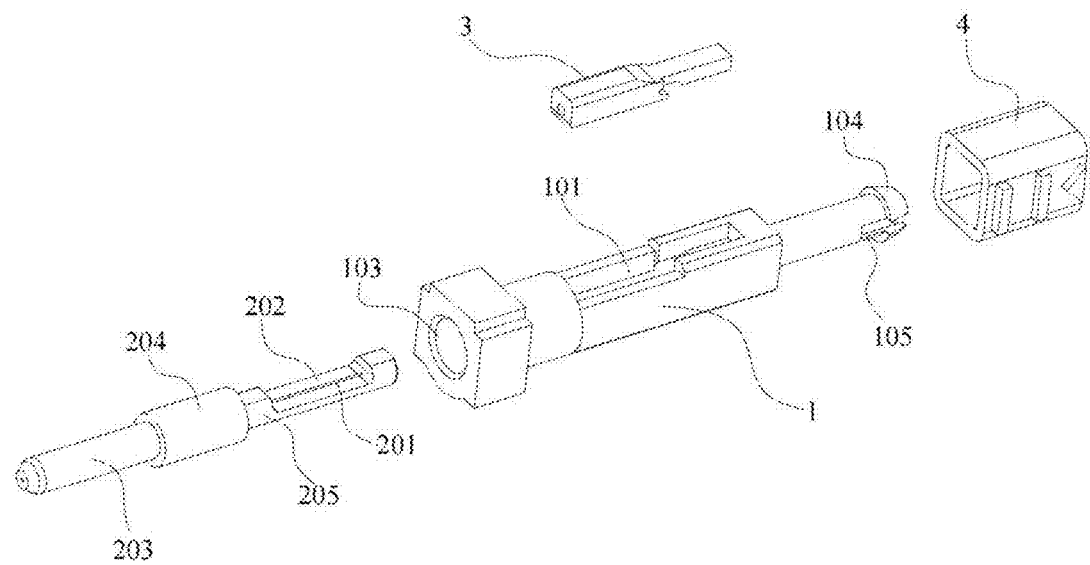
FIG. 2 is a schematic exploded view of a ferrule assembly according to an embodiment of the disclosure.
Figure 3:
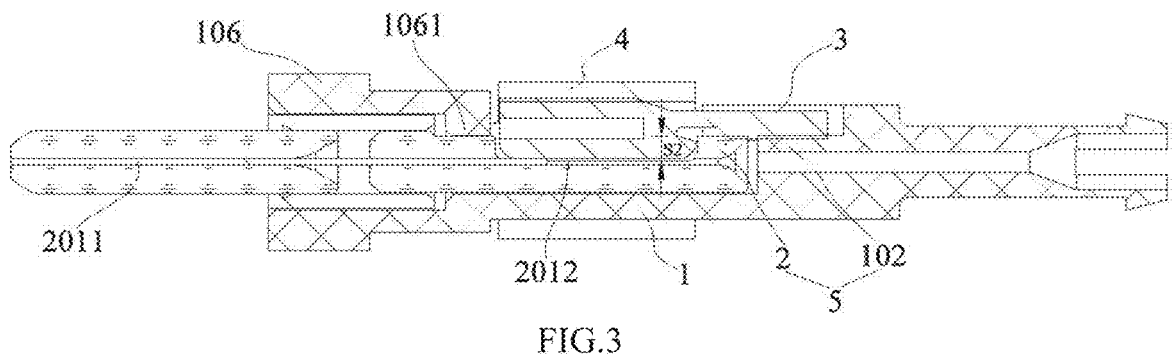
FIG. 3 is a cross-sectional view of a ferrule assembly according to an embodiment of the disclosure.
Figure 4:
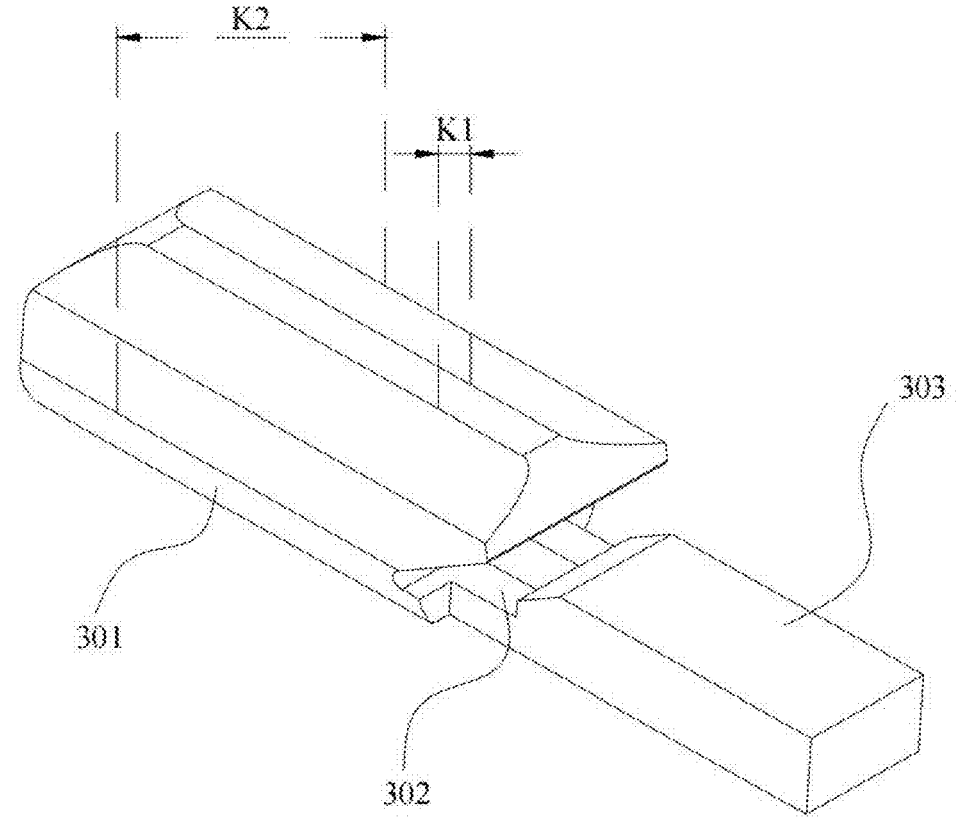
FIG. 4 is a schematic structural view of a pressing block according to an embodiment of the disclosure.
Figure 5:
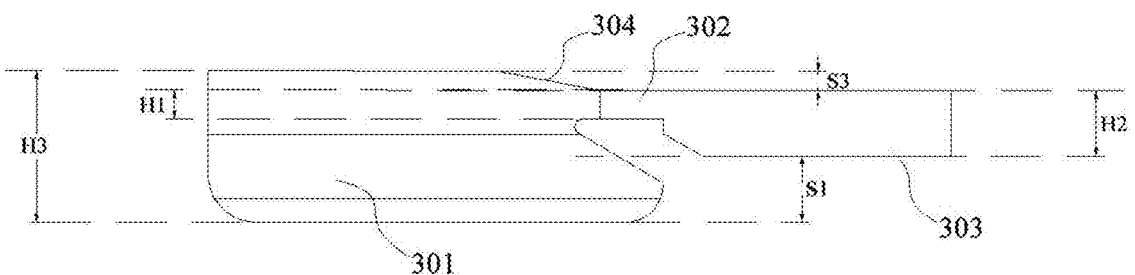
FIG. 5 is a side view of a pressing block according to an embodiment of the disclosure.
Figure 6:
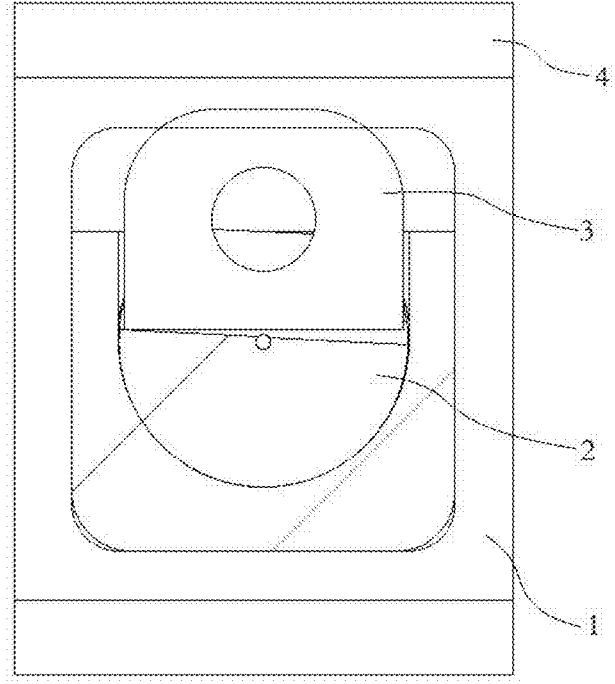
FIG. 6 is a view illustrating the action and effect of a conventional pressing block when the platform to be matched is inclined.
Figure 7:
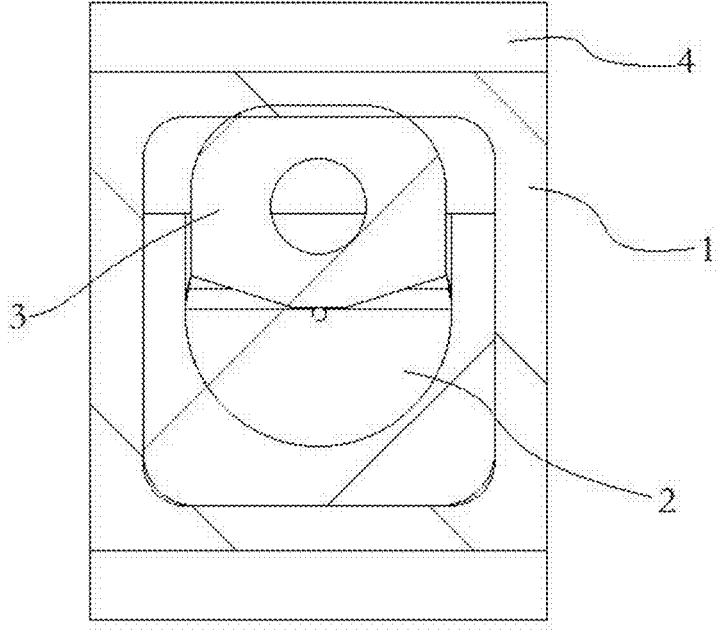
FIG. 7 is a view illustrating the action and effect of a pressing block according to an embodiment of the disclosure.
Figure 8:
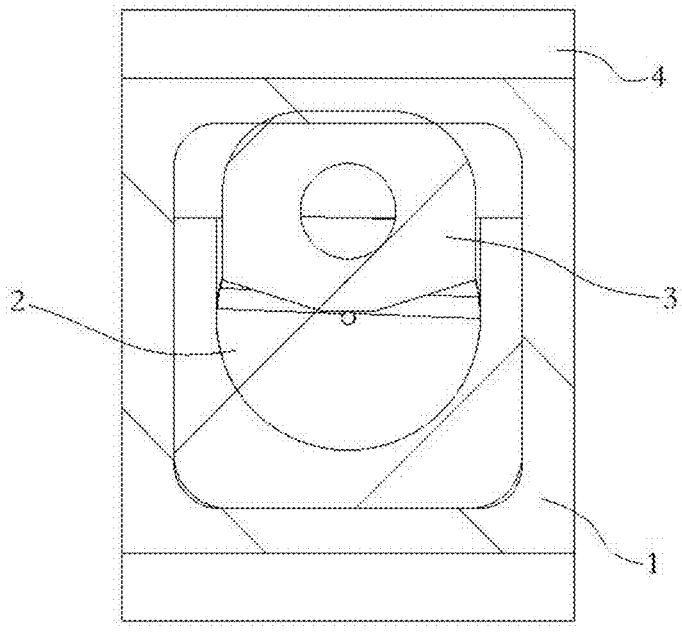
FIG. 8 is a view illustrating the action and effect of a pressing block according to an embodiment of the disclosure when the platform to be matched is inclined.

Referring to FIGS. 1-3, a ferrule assembly according to a preferred embodiment of the disclosure comprises a tailstock 1, a ferrule 2, a pressing block 3, and a lock catch 4. The tailstock 1 is provided with a window portion 101, in which a supporting platform 102 is provided. The tailstock 1 is provided at an end with an opening 103. The ferrule 2 is provided with a receiving cavity 201 for receiving an optical fiber. The ferrule 2 has one end passing through the opening 103 and then, in conjunction with the supporting platform 102, to constitute a stepped portion 5. It is provided with a groove portion 202 corresponding to the window portion 101, and the receiving cavity 201 is exposed on the groove portion 202. The ferrule 2 has another end located outside of the tailstock 1. The pressing block 3 comprises a pressing portion 301, a flexible portion 302, and an end handle portion 303, wherein the pressing portion 301 abuts against and connects with the groove portion 202, the end handle portion 303 abuts against and connects with the stepped portion 5, and the flexible portion 302 is connected with the pressing portion 301 and the end handle portion 303, respectively. The lock catch 4 is slidably sleeved on the tailstock 1.

It should be noted that, the receiving cavity 201 is predisposed with an optical fiber. The end of the ferrule located outside of the tailstock serves as a plug end for connection with a further adapter or connector.

Based on the above solution, the ferrule assembly according to the preferred embodiment of the disclosure has working principle as follows. The optical cable with a further optical fiber can be inserted from the tip end of the tailstock 1 in such a manner that the further optical fiber is inserted into the receiving cavity 201 on the groove portion 202 and spliced to the optical fiber predisposed in the receiving cavity 201. The pressing portion 301 of the pressing block 3 can be matched with groove portion 202, and the end handle portion 303 can be matched with the stepped portion 5. Then, the lock catch 4 can be sleeved outside of the tailstock 1 and movable from the unlock position to the lock position to achieve close fit between the pressing portion 301 and the groove portion 202. Subsequently, the splice joint of optical fibers can be tightened to complete the assembly.

Referring to FIGS. 4-8, in a preferred embodiment, the bottom surface of the pressing portion 301 may have a plane structure with a width less than the maximum width of the pressing portion 301. In particular, the lower surface of the pressing portion 301 with a relative small width can facilitate easy control of flatness thereof. Thus, the impact of the flatness deviation of the lower surface of the pressing portion 301 on the tightness of splice joint of optical fibers can be effectively reduced. Thus, the manufacturing process difficulty and the cost of the pressing block 3 can be reduced as well. As the lower surface of the pressing portion 301 has a relative small width, even when the opening of the groove portion 202 lies in a direction not exactly parallel to the opening of the window portion 101, the gap between the lower surface of the pressing portion 301 and the bottom surface of the groove portion 202 would not be too big due to the limitation from the width of the lower surface of the pressing portion 301. In such a case, it effectively avoids a failure in tightening the splice joint of optical fibers during assembly of the ferrule assembly, and greatly increases assembly efficiency without affecting performance of the fiber optic connector.

In a preferred embodiment, the ratio of the width $K_1$ of the bottom surface of the pressing portion 301 to the maximum width $K_2$ of the pressing portion 301 may be $(0.1-0.5):1$. In particular, if $K_1$ is too high, on one hand, the splice joint of optical fibers may not be tightened with the pressing block 3 when the opening of the groove portion 202 lies in a direction not exactly parallel to the opening of the window portion 101 during assembly, thereby affecting product performance. On the other hand, the flatness deviation of the lower surface of the pressing portion 301 will have a greater impact on the tightness of splice joint of optical fibers. Consequently, to meet the requirement of a same tightness, the device with a greater $K_1$ requires much higher flatness and consistency of the lower surface of the pressing portion 301. Thus, the manufacturing process is more difficult, and the cost is increased. On the contrary, if $K_1$ is too small, it is not easy to completely cover the receiving cavity exposed on the groove portion 202.

In a preferred embodiment, the maximum thickness $H_3$ of the pressing portion 301 may be greater than the thickness $H_1$ of the flexible portion 302 and the thickness $H_2$ of the end handle portion 303, respectively, and the thickness $H_2$ of the end handle portion 303 may be greater than the thickness $H_1$ of the flexible portion 302. In particular, the pressing block 3 has a flexible portion 302. During locking and unlocking processes, the portion of the pressing block 3 which deforms is mainly the flexible portion 302. The flexible portion 302 having a small thickness and high flexibility is easy to deform, facilitating convenient assembly.

In a preferred embodiment, the vertical distance $S_1$ from the bottom surface of the end handle portion 303 to the bottom surface of the pressing portion 301 may be less than the maximum vertical distance $S_2$ from the top surface of the stepped portion 5 to the bottom surface of the groove portion 202. In particular, the design of matching structure, in which $S_1 < S_2$, ensures that the further optical fiber can be appropriately inserted into the inner bore of the groove portion 202 in the unlocking state, and the pressing portion 301 can tightly abut against the splice joint of optical fibers in the locking state.

In a preferred embodiment, $S_1$ and $S_2$ may satisfy a condition of:

$$0.02 \text{ mm} \leq S_2 - S_1$$

Furthermore, $S_2 - S_1 \leq 0.3$ mm

Herein, $H_1$ and $H_3$ may satisfy conditions as follows:

$$2.7 \leq \frac{H_3}{H_1} \leq 10;$$

$$0.2 \text{ mm} \leq H_1 \leq 0.7 \text{ mm}.$$

In particular, due to the design in terms of the size of the pressing block 3, the flexible portion 302 has good flexibility and strength, and it is easy to lock it, i.e., to deform the flexible portion 302 during locking. Furthermore, it has excellent anti-fatigue performance, and the mechanics performance of the pressing block 3 would not be impaired even after repeated locking and unlocking operations. The difference between the values of $S_2$ and $S_1$ in the range, on one hand, ensures that the further optical fiber can be appropriately inserted into the inner bore of the groove portion 202 when the flexible portion 302 is in an undeform state. On the other hand, it ensures that the pressing portion 301 can tightly abut against the splice joint of the predisposed optical fiber and the further optical fiber to make sure the two optical fibers are coaxial and centered when the flexible portion 302 is in a deform state.

In a preferred embodiment, the ferrule 2 may comprise a first ferrule 203, a second ferrule 205, and a connecting component 204, wherein a jack is located on the first ferrule 203, the groove portion 202 is provided on the second ferrule 205, and the first ferrule 203 and the second ferrule 205 are connected through the connecting component 204.

Figure 9:
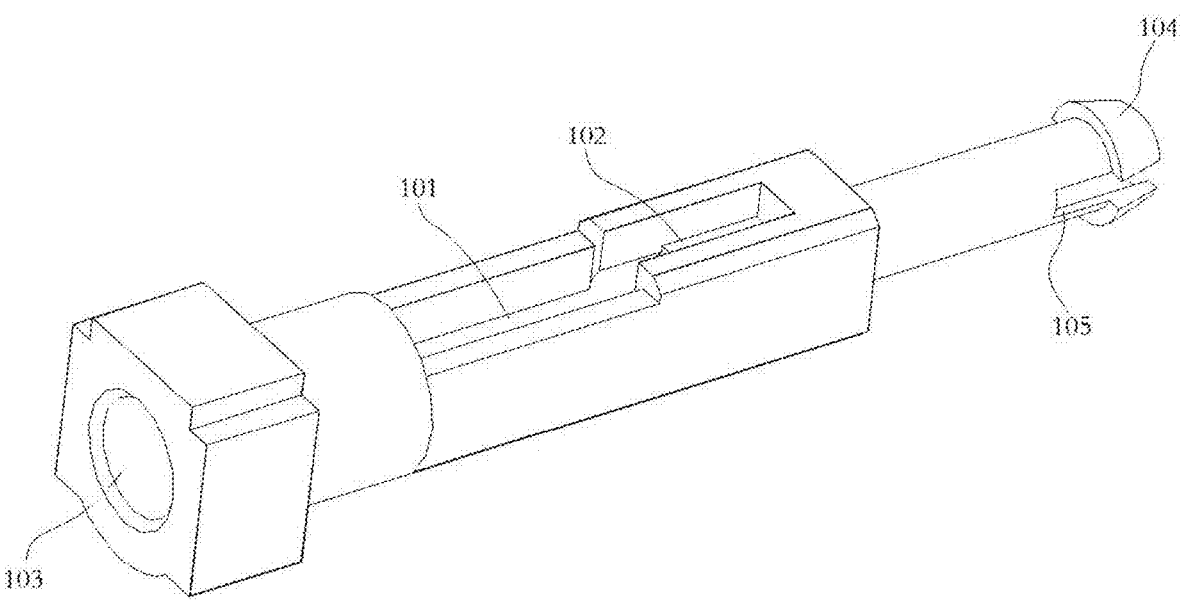
FIG. 9 is a schematic structural view of a tailstock according to an embodiment of the disclosure.
Figure 20:
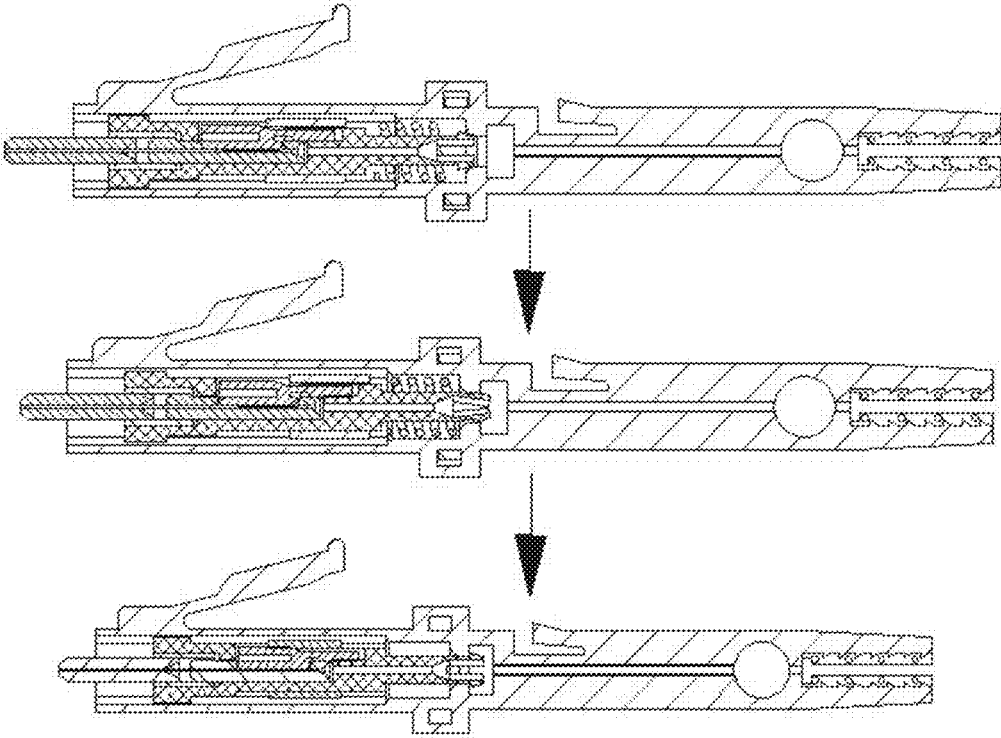
FIG. 20 is a view illustrating an assembly process of a tailstock of a fiber optic fast connector according to an embodiment of the disclosure.

Referring to FIGS. 9 and 20, in a preferred embodiment, the tailstock 1 may be provided at one end with a limiting hook 104 and a slot 105, wherein the slot 105 extends along the longitudinal direction of the tailstock 1. In particular, during assembly of the optical fiber connector, the deformation mainly occurs on the tip end of the tailstock 1 when the limiting hook 104 passes through the gap. In such a case, it avoids too much deformation occurs on the limit protrusion of the connector body to cause permanent deformation or damage, ensuring stability of the optical fiber connector. Meanwhile, as deformation performance of the tip end of the tailstock 1 is improved, it saves labor during manual assembly and has high assembly efficiency.

In a preferred embodiment, one end of the tailstock 1 may be cylinder-shaped, and the ratio of the width of the slot 105 to the diameter of the end of the tailstock 1 is less than 0.5:1. In particular, if the slot 105 has a greater width, the fastening strength may be low, and the tailstock 1 may easily come off from the inner bore of the connector body.

Figure 21:
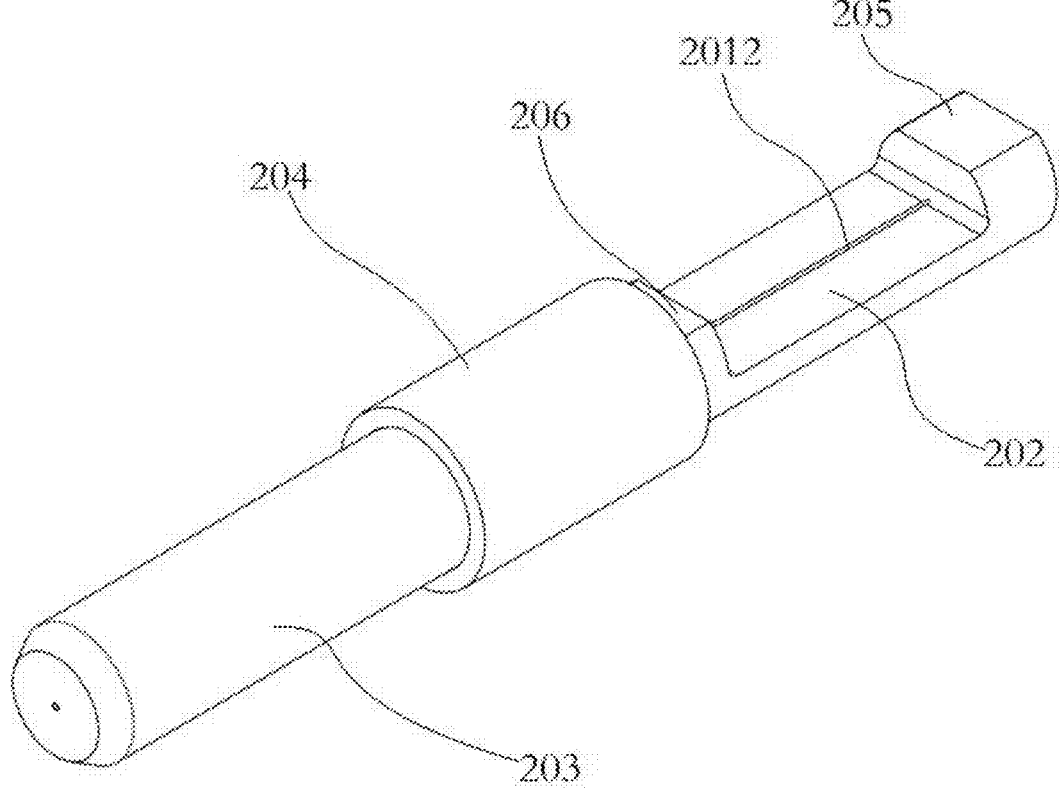
FIG. 21 is a schematic structural view of a ferrule according to an embodiment of the disclosure.
Figure 22:
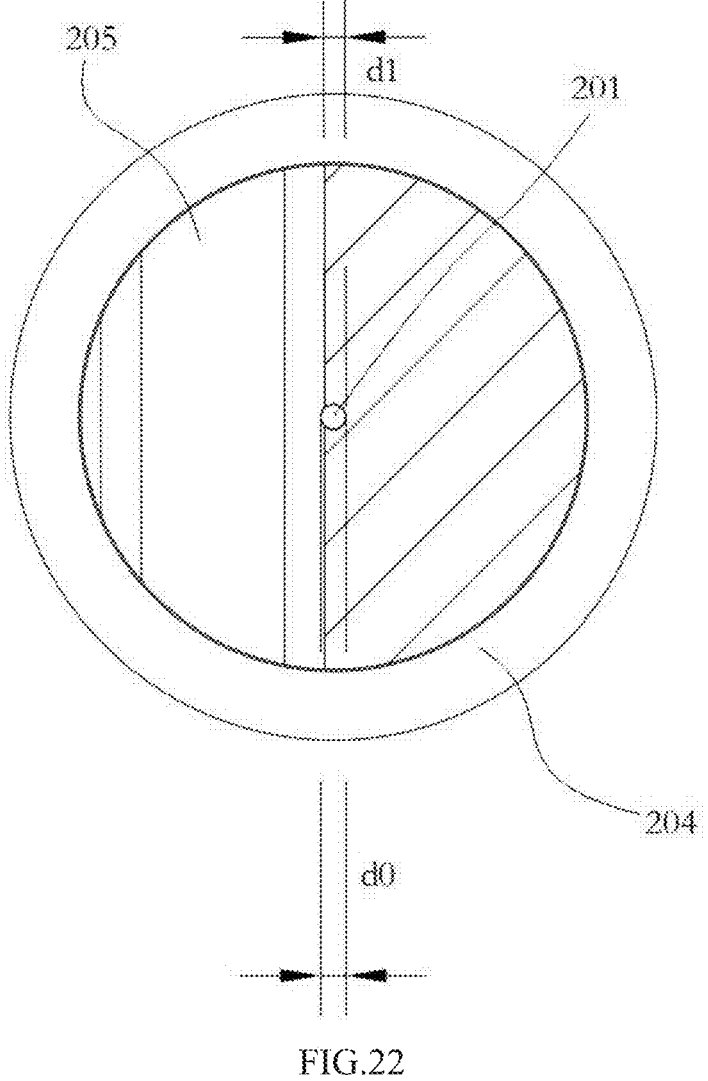
FIG. 22 is a cross-sectional view of a ferrule according to an embodiment of the disclosure.

Referring to FIGS. 21 and 22, in a preferred embodiment, the receiving cavity 201 may comprise a first cavity section 2011 provided inside the ferrule 2 and a second cavity section 2012 exposed on the groove portion 202. The ratio of the depth $d_1$ of the second cavity section 2012 to the diameter do of the first cavity section 2011 is greater than 1:2. Preferably, a cross section of the first cavity section of the receiving cavity is rounded shape, and a cross section of the second cavity section of the receiving cavity is circular shape. In particular, as the first cavity section 2011 of the receiving cavity is provided inside the ferrule 2, the second cavity section 2012 is exposed on the groove portion 202, and the ratio of the depth $d_1$ of the second cavity section to the diameter do of the first cavity section is greater than 1:2, it ensures that, even in the case that the matching accuracy degree in terms of the size of the groove portion 202 of the ferrule 2 and other parts of the ferrule assembly 7 is low, the optical fiber can be strictly maintained in receiving cavity 201 during inserting. Even when the receiving cavity 201 of the groove portion 202 is exposed, the optical fiber would not be deviated from the receiving cavity 201, thereby ensuring the quality of the splicing of the predisposed optical fiber and the further optical fiber.

In a preferred embodiment, the ratio of the depth $d_1$ of the second cavity section 2012 to the diameter do of the first cavity section 2011 is less than 0.992. In particular, if $d_1/d_0 > 0.992$, the requirement for the flatness of the lower surface of the pressing block 3 may be higher, and the permissable range for the tolerance may be lower. In addition, the pressing force of the pressing block 3 may mainly apply on the bottom surface of the groove portion 202. Thus, the pressing force applied on the optical fiber may be not enough, thereby affecting the product performance.

In a preferred embodiment, the tailstock may have a sleeving portion 106, and the ferrule 2 may pass through the sleeving portion 106 in such a manner that the groove portion 202 is exposed on the window portion 101. The edge of the sleeving portion 106 proximal to the window portion 101 extends inward to form a snap protrusion 1061. The ferrule 2 is provided with an engaging platform 206, and the snap protrusion 1061 abuts against the engaging platform 206 and limits rotation of the ferrule 2 about the axial direction.

In a preferred embodiment, two slots 105 may be provided, which are arranged on the tip end of the tailstock 1 in a symmetrical manner with respect to each other.

In a preferred embodiment, the lock catch 4 may be moveable in an area corresponding to the pressing block 3, and an interference fit may be created when the lock catch 4 is moved to the position corresponding to the pressing portion 301.

In a preferred embodiment, the upper surface of the pressing portion 301 protrudes farther than the upper surface of the flexible portion 302, and an inclined transition surface is provided between the upper surface of the pressing portion 301 and the upper surface of the flexible portion 302.

Figure 10:
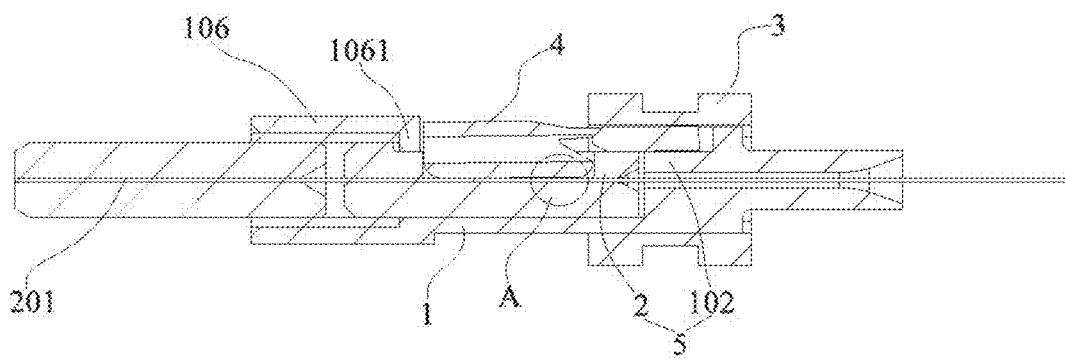
FIG. 10 is a view illustrating a ferrule assembly according to an embodiment of the disclosure in an unlocking state.
Figure 11:
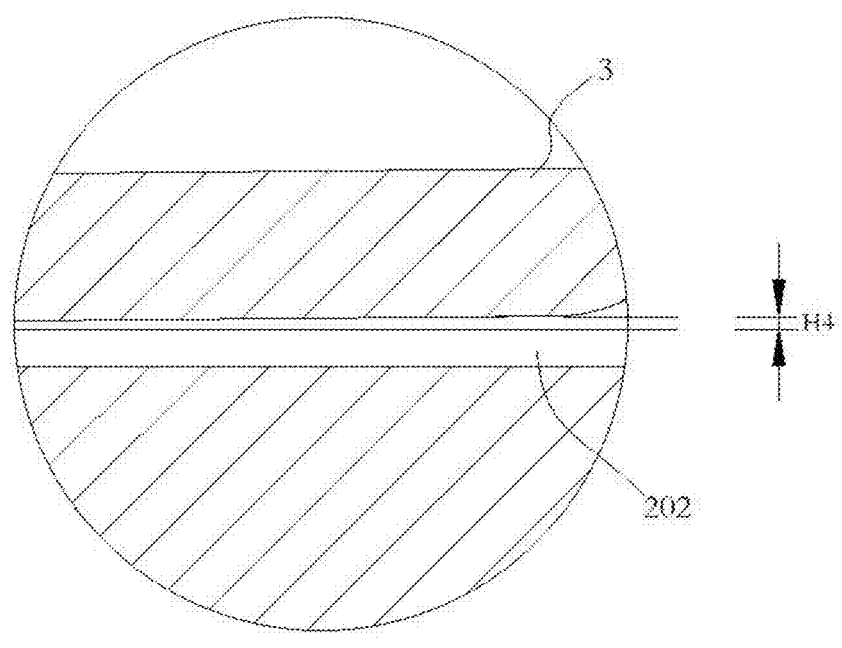
FIG. 11 is an enlarged view of area A as shown in FIG. 10.
Figure 12:
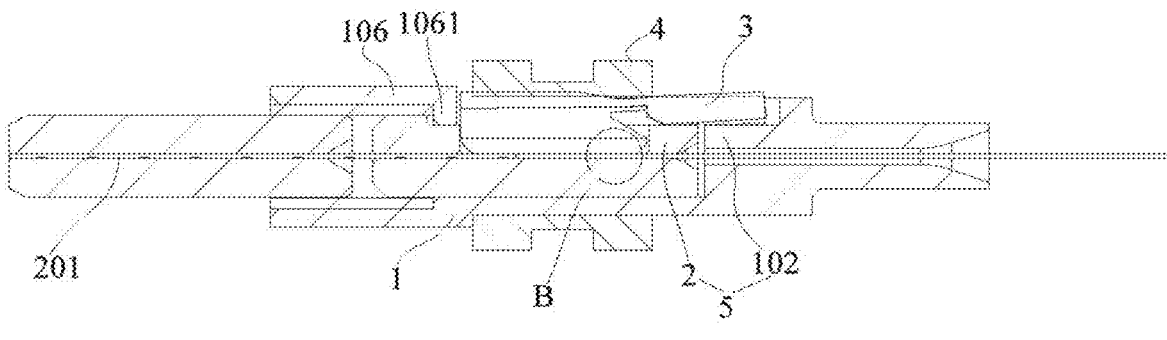
FIG. 12 is a view illustrating a ferrule assembly according to an embodiment of the disclosure in a locking state.
Figure 13:
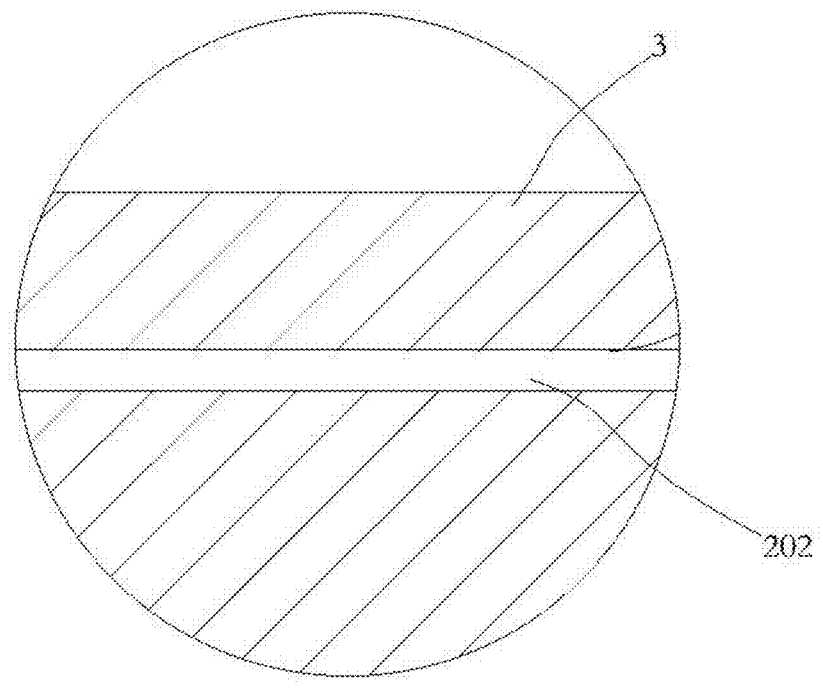
FIG. 13 is an enlarged view of area B as shown in FIG. 12.
Figure 14:
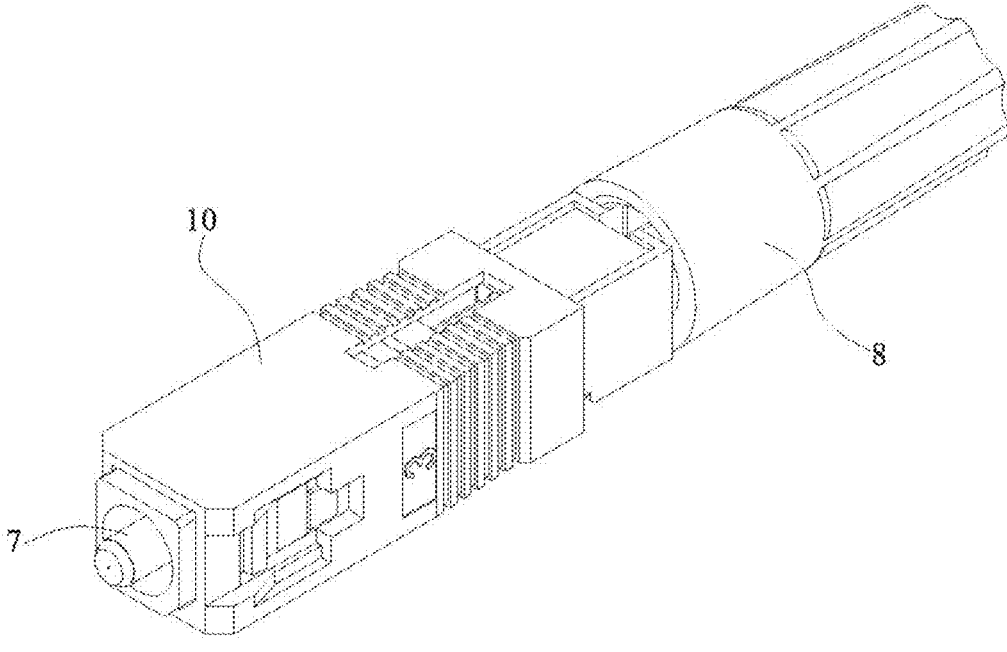
FIG. 14 is a schematic structural view of a fiber optic fast connector according to an embodiment of the disclosure.
Figure 15:
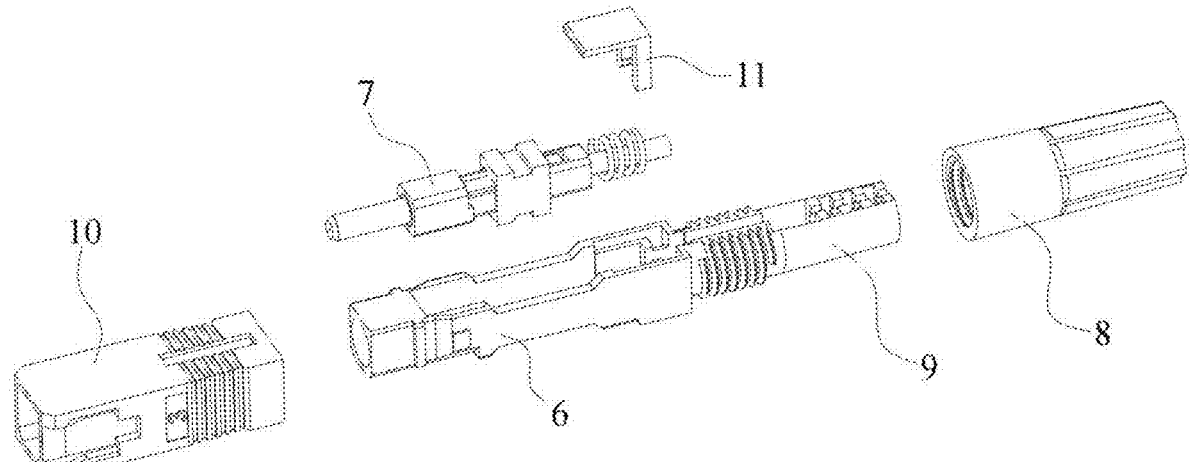
FIG. 15 is an exploded view of the fiber optic fast connector as shown in FIG. 14.
Figure 16:
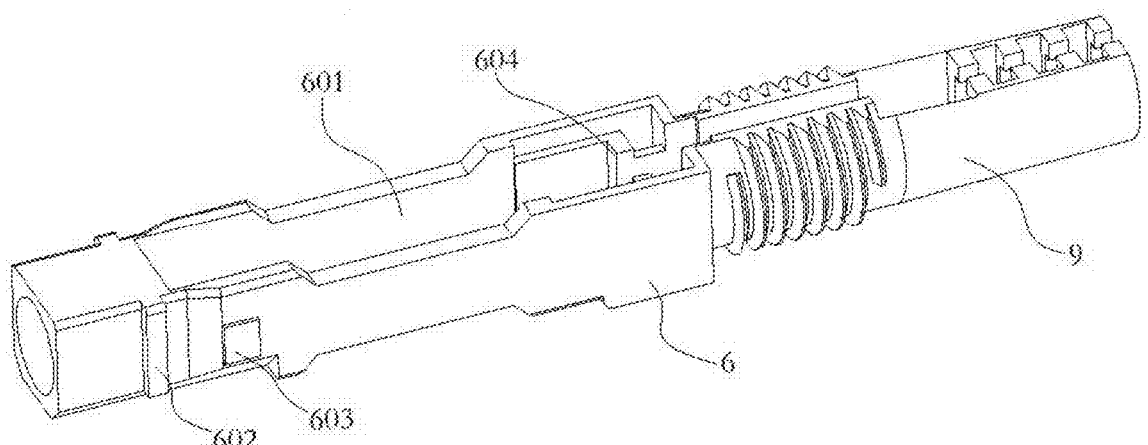
FIG. 16 is a schematic structural view of a body of the fiber optic fast connector as shown in FIG. 14.
Figure 17:
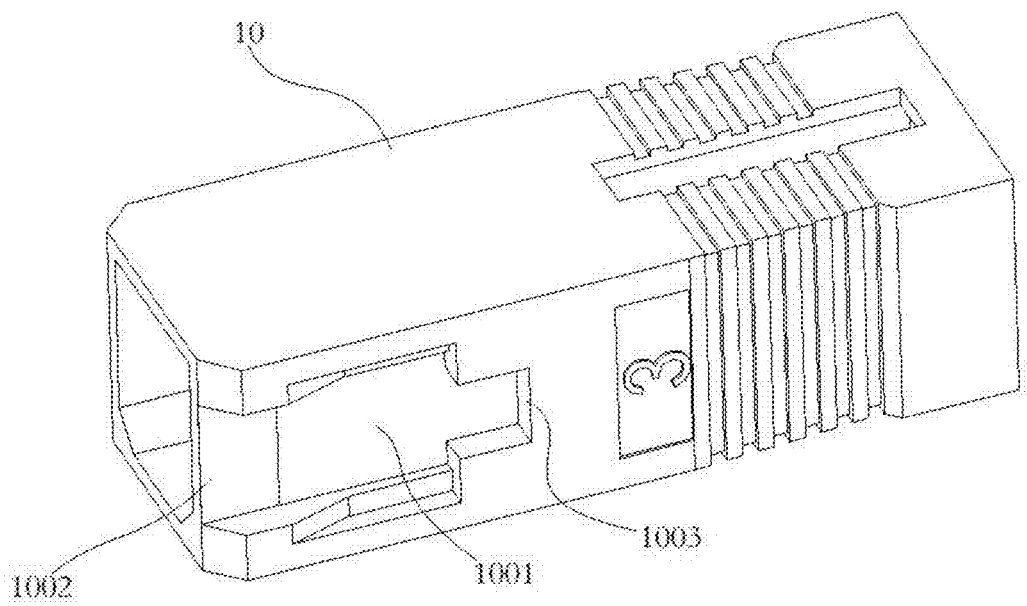
FIG. 17 is a schematic structural view of a front cover of the fiber optic fast connector as shown in FIG. 14.
Figure 18:
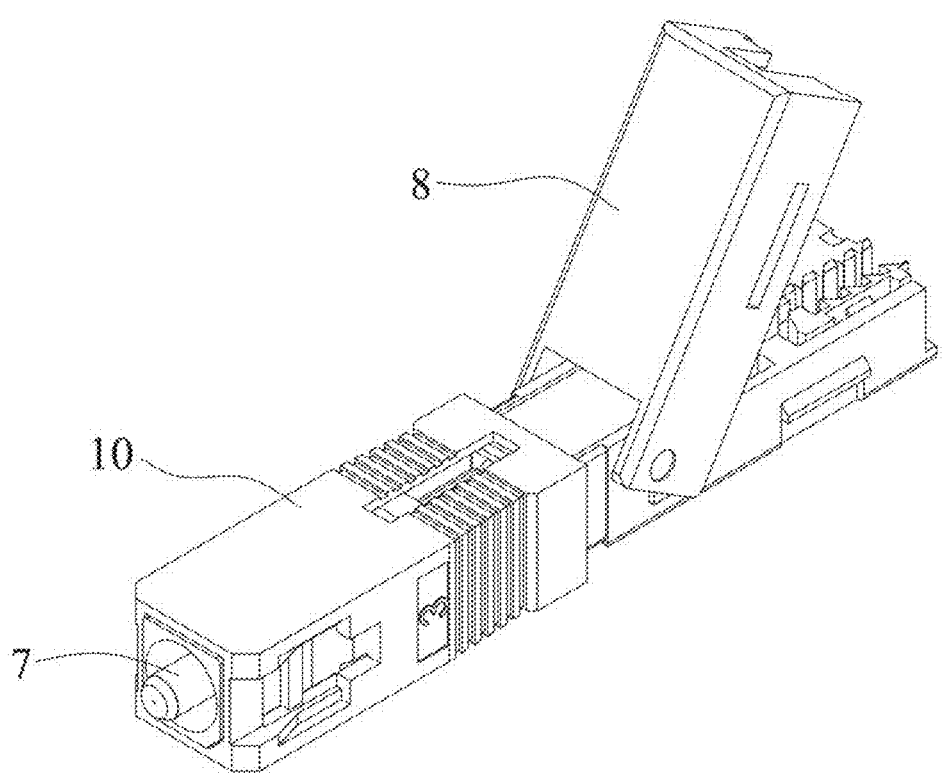
FIG. 18 is a further schematic structural view of a fiber optic fast connector according to an embodiment of the disclosure.
Figure 19:
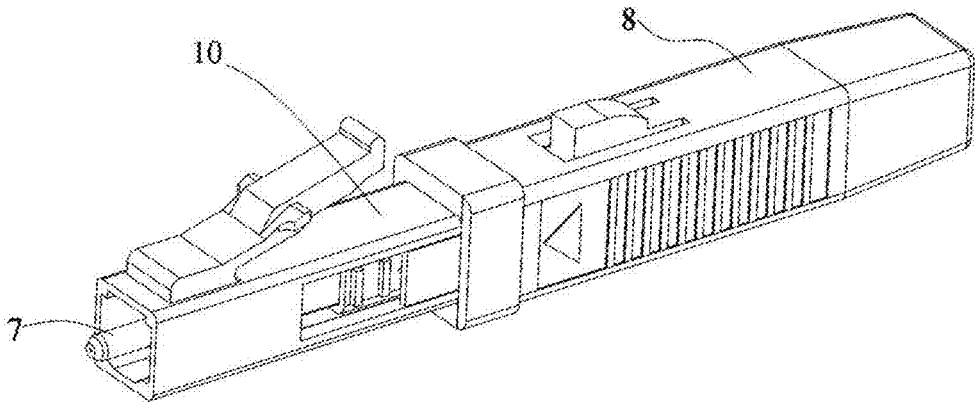
FIG. 19 is a further schematic structural view of a fiber optic fast connector according to an embodiment of the disclosure.

Referring to FIGS. 10-12, in a preferred embodiment, when the ferrule assembly is in the unlocking state, the lock catch 4 is located at a position corresponding to the end handle portion 303, and there is spare space between the lower surface of the pressing portion 301 and the bottom surface of the groove portion 202. When the ferrule assembly is in the locking state, the lock catch 4 is located at a position corresponding to the pressing portion 301, and the lower surface of the pressing portion 301 and the bottom surface of the groove portion 202 form a close, tight fit.

In a preferred embodiment, when the ferrule assembly is in the unlocking state, the flexible portion 302 is in natural, unstressed, undeformed state; and when the ferrule assembly is in the locking state, the flexible portion 302 is in stressed, deformed state.

In a preferred embodiment, the height $H_4$ of the spare space $\leq$ the height difference $S_3$ between the upper surface of the pressing portion 301 and the upper surface of the flexible portion 302. Such design ensures that the lower surface of the pressing portion 301 and the bottom surface of the groove portion 202 can form a close, tight fit when the lock catch 4 is displaced to the area corresponding to the pressing portion 301.

Referring to FIGS. 13-19, according to a preferred embodiment of the disclosure, a fiber optic fast connector is provided, which comprises a body 6 and a ferrule assembly 7 according to any one of those mentioned above, wherein the ferrule assembly 7 is mounted inside the body 6.

It should be noted that, the body 6 of the fiber optic fast connector may be provided with a body window portion 601, the ferrule assembly 7 may be sheathed in the lumen of the body 6 in such a manner that one end of the ferrule extends out of the opening in the front of the body 6, and the lock catch 4 may be moveable in a range and exposed on the body window portion 601.

In a preferred embodiment, the fiber optic fast connector may further comprise a rear cover 8 and an optical cable holder 9, wherein the optical cable holder 9 is arranged at the tip end of the body 6, and the rear cover 8 is sleeved outside of the tip end of the body 6.

In a preferred embodiment, the optical cable holder 9 may be detachably separated from the body 6, or integrally formed with the body 6.

In a preferred embodiment, the rear cover 8 and the body 6 are connected by rotatable connection, screwed connection, or snap-fit connection.

In a preferred embodiment, the optical fiber connector may further comprise a front cover 10. The front cover 10 may be sleeved outside of the front end of the body 6. At least one side wall of the front end of the body 6 is provided, on the outer surface, with a first abutment protrusion 602 and a second abutment protrusion 603, and the two abutment protrusions are arranged in the axial direction of the body 6 at an interval. The front cover 10 is provided on at least one side wall with an abutment window 1001. The front cover 10 is sleeved outside of the front end of the body 6, and the two abutment protrusions are placed in the abutment window 1001. The first abutment protrusion 602 can abut against the front abutment side 1002 of the abutment window 1001, such that rearward movement of the front cover 10 can be limited. The second abutment protrusion 603 can abut against the rear abutment side 1003 of the abutment window 1001, such that forward movement of the front cover 10 can be limited. Herein, the height of the first abutment protrusion 602 is lower than the height of the second abutment protrusion 603. The front abutment side 1002 is closer to the lumen of the front cover 10 than the rear abutment side 1003. Furthermore, the front cover 10 is provided with a clip mating opening, and the lock catch 4 is exposed on the clip mating opening.

In a preferred embodiment, the side wall in the lumen of the body 6 is provided with a limit protrusion 604, and the limit protrusion 604 snap fits with the limiting hook 104 to limit the movement of the ferrule assembly 7 towards the front end of the body 6.

In conclusion, compared with prior arts, the ferrule assembly and the fiber optic fast connector comprising the same according to the preferred embodiments of the disclosure has advantages as follows.

Due to the design of matching structure including pressing block 3, the groove portion 202, and the window portion 101 of the tailstock 1 in the present invention, it does not need too much force to move the lock catch 4 to the position corresponding to the pressing portion 301 during the locking process. Thus, the assembly efficiency can be improved. In the locking state, as the portion of the pressing block 3 which deforms is mainly the flexible portion 302 which has well flexibility and small deformation restoring force, the acting force of the lock catch 4 is sufficient to ensure the close, tight fit between the pressing portion 301 of the pressing block 3 and the bottom surface of the groove portion 202, and ensure tightened splice joint of optical fibers under the applied force. The flexible portion 302 has well flexibility and thus has good anti-fatigue performance. The original performance of the pressing block 3 can be maintained even after repeated locking and unlocking operations, thereby preventing a decrease in stability of the optical fiber connector.

All the above are merely preferred embodiments of the disclosure. It should be noted that the present invention is intended to cover all equivalent arrangements and modifications obtained by those of ordinary skill in the art without departing from the technical principle of the invention.

The invention claimed is:

1. A ferrule assembly, characterized by comprising:
a tailstock, provided with a window portion in which a supporting platform is provided, and having one end provided with an opening;
a ferrule, provided inside with a receiving cavity for receiving an optical fiber, wherein the ferrule has one end passing through the opening and, in conjunction with the supporting platform, constituting a stepped portion, and provided with a groove portion, which corresponds to the window portion; wherein the ferrule has another end located outside of the tailstock, and the receiving cavity extends through the one end and the other end of the ferrule and is exposed on the groove portion;
a pressing block;
a lock catch, slidably sleeved on the tailstock;
wherein the pressing block comprises a pressing portion, a flexible portion, and an end handle portion, the flexible portion connects with the pressing portion and the end handle portion, respectively; the pressing portion abuts against and connects with the groove portion, and the end handle portion abuts against and connects with the stepped portion;
wherein a maximum thickness $H_3$ of the pressing portion is greater than a thickness $H_1$ of the flexible portion and a thickness $H_2$ of the end handle portion, respectively, and the thickness $H_2$ of the end handle portion is greater than the thickness $H_1$ of the flexible portion; wherein a vertical distance $S_1$ from a bottom surface of the end handle portion to a bottom surface of the pressing portion is less than a maximum vertical distance $S_2$ from a top surface of the stepped portion to a bottom surface of the groove portion;
wherein $S_1$ and $S_2$ satisfy a condition of:

$$0.02 \text{ mm} \le S_2 - S_1;$$

and
$H_1$ and $H_3$ satisfy conditions of:

$$2.7 \le \frac{H_3}{H_1} \le 10; \text{ and}$$

$$0.2 \text{ mm} \le H_1 \le 0.7 \text{ mm};$$

wherein in response to that the ferrule assembly is in an unlocking state, the lock catch is located at a position corresponding to the end handle portion, and there is spare space between a lower surface of the pressing portion and a bottom surface of the groove portion; wherein a height $H_4$ of the spare space≤a height difference $S_3$ between an upper surface of the pressing portion and an upper surface of the flexible portion.

2. The ferrule assembly according to claim 1, wherein a bottom surface of the pressing portion has a plane structure with a width less than a maximum width of the pressing portion.

3. The ferrule assembly according to claim 2, wherein a ratio of a width $K_1$ of the bottom surface of the pressing portion to the maximum width $K_2$ of the pressing portion is (0.1-0.5):1.

4. The ferrule assembly according to claim 1, wherein the ferrule comprises a first ferrule, a second ferrule, and a connecting component, wherein the first ferrule is provided with a jack, the groove portion is provided on the second ferrule, and the first ferrule and the second ferrule are connected through the connecting component.

5. The ferrule assembly according to claim 1, wherein the tailstock is provided, at one end distal to the opening, with a limiting hook and a slot, and the slot extends along a longitudinal direction of the tailstock.

6. The ferrule assembly according to claim 5, wherein one end of the tailstock is cylinder-shaped, and a ratio of a width of the slot to a diameter of the end of the tailstock is less than 0.5:1.

7. The ferrule assembly according to claim 1, wherein the receiving cavity comprises a first cavity section provided inside the ferrule and a second cavity section exposed on the groove portion, and a ratio of a depth $d_1$ of the second cavity section to a diameter $d_0$ of the first cavity section is greater than 1:2.

8. The ferrule assembly according to claim 7, wherein a ratio of the depth $d_1$ of the second cavity section to the diameter $d_0$ of the first cavity section is less than 0.992.

9. The ferrule assembly according to claim 1, wherein the tailstock has a sleeving portion, and the ferrule passes through the sleeving portion in such a manner that the groove portion is exposed on the window portion, an edge of the sleeving portion proximal to the window portion extends inward to form a snap protrusion, the ferrule is provided with an engaging platform, and the snap protrusion abuts against the engaging platform and limits rotation of the ferrule about an axial direction.

10. A fiber optic fast connector, characterized by comprising: a body and the ferrule assembly according to claim 1, wherein the ferrule assembly is mounted inside the body.

\*   \*   \*   \*   \*